United States Patent [19]

Verhoeven

[11] Patent Number: 4,491,866
[45] Date of Patent: Jan. 1, 1985

[54] METHOD OF A DEVICE FOR GENERATING DIFFERENTIAL IMAGES

[75] Inventor: Leonardus A. J. Verhoeven, Eindhoven, Netherlands

[73] Assignee: U.S. Philips Corporation, New York, N.Y.

[21] Appl. No.: 411,733

[22] Filed: Aug. 26, 1982

[30] Foreign Application Priority Data

Jun. 15, 1982 [NL] Netherlands .......................... 8202415

[51] Int. Cl.³ ............................................. H04N 7/18
[52] U.S. Cl. .................................... 358/111; 358/174; 364/414; 378/99
[58] Field of Search ............... 358/111, 168, 169, 174; 378/99; 364/414

[56] References Cited

U.S. PATENT DOCUMENTS

| | | | |
|---|---|---|---|
| 4,367,490 | 1/1983 | Riederer | 358/111 |
| 4,375,068 | 2/1983 | McBride | 358/111 |
| 4,393,402 | 7/1983 | Keyes | 378/99 |

Primary Examiner—Howard W. Britton
Attorney, Agent, or Firm—Jack E. Haken

[57] ABSTRACT

The invention relates to a method of and a device for generating differential images in which the effect of fluctuations of the X-ray pulse or the gain of the images intensifier/image pick-up tube network on the differential image is eliminated. To this end, the peak value is determined for each X-ray image in order to be stored in a fixed location in a memory. The difference between the logarithms of the peak values is added to the differential image, so that said fluctuations are compensated for.

8 Claims, 7 Drawing Figures

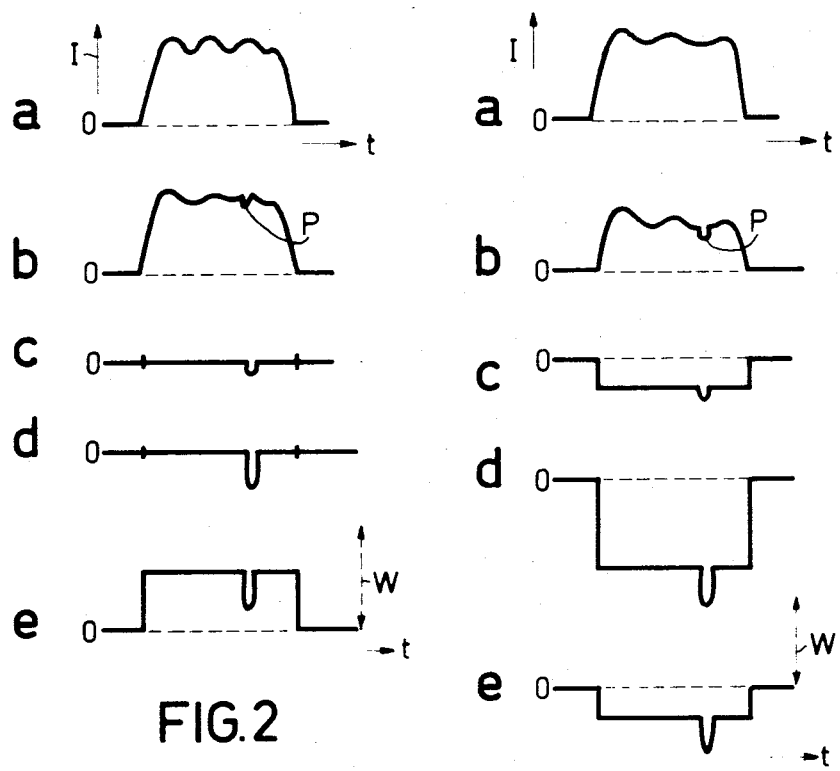
FIG.2　FIG.3
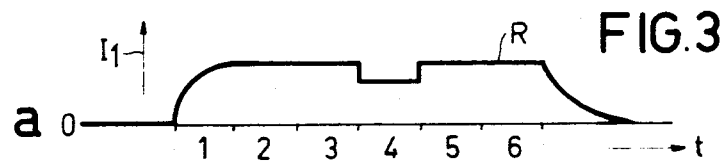
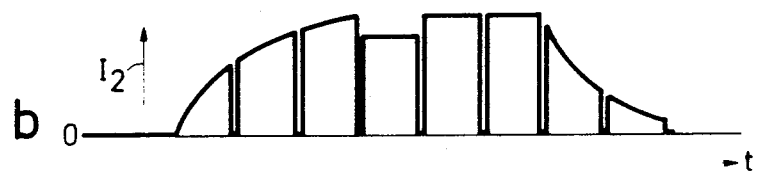
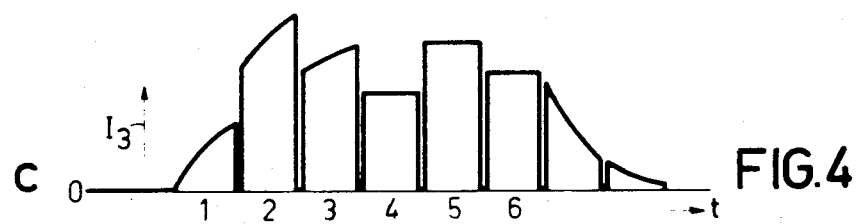
FIG.4

METHOD OF A DEVICE FOR GENERATING DIFFERENTIAL IMAGES

BACKGROUND OF THE INVENTION

The invention relates to a method of processing X-ray images in which the difference is formed between two stored images, each of which has been formed from at least one X-ray image. The invention also relates to a device for the processing of X-ray images, comprising an X-ray image-forming device for producing X-ray images, at least two memories, each of which is used for the storage of an image which has been formed from at least one X-ray image, arithmetic means for determining the difference between the two images stored in the memories, and display means for displaying the differential image.

A method and a device of this kind are known from European Patent Publication No. 00 37.722. Such a device enables, for example, clear display of the cardiovascular system of the human body by determination of differential images on a pixel-by-pixel basis from X-ray images which are formed before as well as after the injection of a contrast medium into the cardiovascular system. The differential images should reveal only changes (the vascular system with/without medium). The part of the X-ray images which does not change for example, bone and tissue structures, should be completely eliminated by the determination of the differential image. In the ideal case, the differential image equals zero, except where the blood vessels containing contrast medium are present. The difference in contrast in a differential image is very small (a few percent), so that it is necessary to increase the contrast in order to achieve adequate visibility on, for example, a television screen. It is also necessary to add a so-called grey pedestal (constant value) to the signal values of the differential image in order to bring these signal values within the operating range of the television monitor.

It has been found, that the grey level fluctuates during the determination and display of the differential images on the television monitor. These fluctuations are due to the fact that the X-ray pulses and/or the signal transmission in the image intensifier/image pick-up tube network producing the X-ray images are not constant. Not only switch-on phenomena, but also variations of the X-rays (dip in the high voltage due to switching on of other hospital equipment) and, for example, fluctuations in the gain of the image intensifier have a serious adverse effect on the differential images to be displayed.

The use of video AGC circuits (automatic gain control circuits) does not offer an adequate solution to this problem in such devices. Circuits of this kind have a control time constant so that, for example, the first (two) X-ray images cannot be effectively used for the determination of the differential image. The foregoing holds good only when a switch-on phenomenon is concerned. If the X-rays exhibit further fluctuations, an AGC circuit imposes additional problems. This will be elaborated hereinafter.

SUMMARY OF THE INVENTION

It is the object of the invention to provide a method and a device in which the adverse effect of fluctuations of the X-rays and of the signal transmission in the image intensifier pick-up tube chain is mitigated.

To this end, a method in accordance with the invention is characterized in that a difference is determined between the logarithms of the peak value of each image, the peak value difference being added to the difference of the logarithms of the images. To this end, a device in accordance with the invention is characterized in that the device comprises detection means for detecting the peak value difference of the logarithms of the images, further storage means for the storage of the peak value difference, and correction means for adding the peak value difference to the differential image. The elimination of the effect of the described fluctuations can be explained as follows. The peak value $A1$ of an image, determined with an X-ray pulse $V_1$, can be expressed as $A1 = V_i \cdot e^{-\mu \cdot d}$, in which $\mu d$ represents the attenuation of the X-rays in a patient. The peak value $A2$ of the image information of a second (X-ray) image, determined with an X-ray pulse $V_2 = \alpha \cdot V_1$, equals $A_2 = V_2 \cdot e^{-\mu d} = \cdot V_i e^{-\mu d}$. The difference between the logarithms of the peak values $\log A1 - \log A2 = -\mu d + \log V_1 - (-\mu d + \log V_2) = \log V_1 - \log(\alpha \cdot V_1) = -\log \alpha$. Therefore, when the difference between the logarithms of the values is added to the differential image determined from the first and the second X-ray image, the effect of fluctuations (of the X-ray pulse) during the formation of the first and the second X-ray image is eliminated.

A preferred version of a method in accordance with the invention is characterized in that the peak values of the X-ray images which are sub-divided into pixels are measured and stored in at least one of the last pixels of the image, after which the difference between the logarithms of the peak values stored is determined, followed by the storage and addition of the peak value difference to each pixel of the differential image.

A preferred embodiment of a device in accordance with the invention is characterized in that a peak value detection circuit is connected to an output of the device for producing X-ray images, there being provided switching means for supplying a peak value detected in an X-ray image to the memory in order to store the peak value in a non-significant part of the image which is stored in the memory, the arithmetic means for the determination of the differential image comprising a subtraction circuit which receives the logarithms of the amplitudes of the images stored in the memories, the output of the subtracting circuit being connected to an adder circuit and to a buffer circuit for the storage of the difference between the logarithms of the peak values of the images stored, a further input of said adder circuit being connected to an output of the buffer circuit in order to add the logarithmic peak value difference to the differential image.

The invention will be described in detail hereinafter with reference to some embodiments which are shown in the drawing; therein:

THE FIGURES

FIGS. 1a and b show a basic diagram of a device for generating differential images;

FIGS. 2a to e show waveforms occurring during determination of a differential image;

FIGS. 3a to e show waveforms occurring during determination of the differential image in the case of varying X-ray pulses;

FIGS. 4a, b and c diagrammatically show a varying X-ray pulse, the variation of video signals, and the effect of an AGC circuit;

Figure 1A:
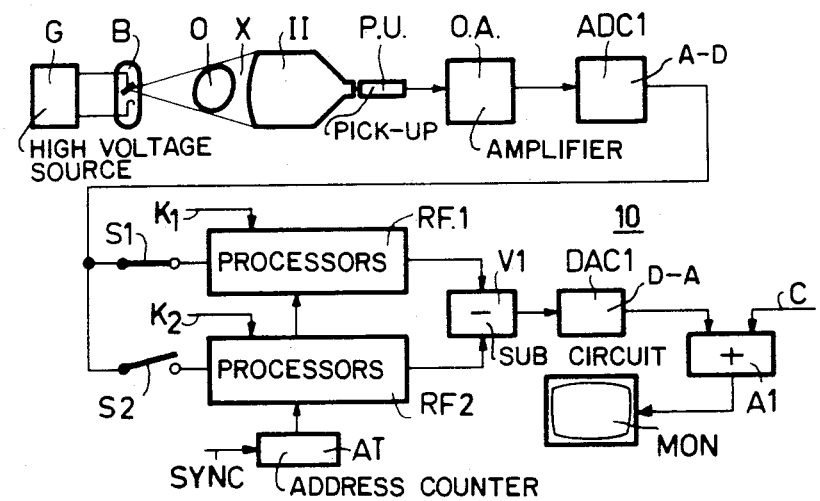

The X-ray examination device for generating differential X-ray images which is shown in FIG. 1a comprises a high-voltage source G for powering an X-ray tube B, an image intensifier II, a pick-up tube PU, an amplifier OA, an analog-to-digital converter ADC1, and two processing devices RF1 and RF2 which are connected to the input of the analog-to-digital converter ADC1 via switches S1 and S2. The outputs of the processing devices are connected to arithmetic means, actually a subtraction circuit $V_1$, an output of which is connected to a display device MON via a digital-to-analog converter DAC1 and an adder circuit A1.

Figure 1B:
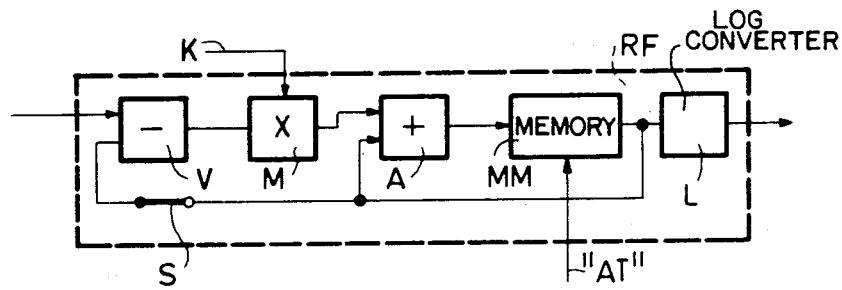

The digitized video signal is applied, via switch S1 or S2, to one of the processing devices RF1 and RF2, a block diagram RF of which is shown in FIG. 1b. The processing device RF comprises a recursive filter which consists of a subtraction circuit V, a multiplier M, an adder circuit A, and a memory MM, and also a logarithmic converter L which applies the logarithmic value of the image content stored in the memory MM to the subtraction circuit $V_1$ (FIG. 1a). Using the subtraction circuit $V_1$, a differential image is formed from the images stored in the memories MM of the two processing devices, said differential image being displayed on the monitor via the converter DAC1, after the addition of a so-called grey pedestal C to the differential image by means of the adder circuit A1.

The processing circuit RF (FIG. 1b) comprises a recursive filter which receives the digitized video image. From the images supplied, the recursive filter forms a composite image which consists of a weighted sum of the supplied X-ray images in accordance with the formulae:

$$V_{u(i+1)} = K \cdot V_{i(i)} + (1-K) \cdot V_{u(i)},$$

in which $V_{i(i)}$ is the $i^{th}$ video-image presented, $V_{u(i)}$ is the $i^{th}$ composite image stored in the memory MM, $V_{u(i+1)}$ is the $(i+1)^{th}$ composite image stored in the memory MM, and K is a weighting factor ($0 \leq K \leq 1$).

In order to achieve this result, the $i^{th}$ composite image is read from the memory MM in order to be applied to the subtraction circuit V which also receives the $i^{th}$ video image. The difference is multiplied by a factor K by a multiplier M in order to be added to the $i^{th}$ composite image in an adder circuit A which is connected to the outputs of the multiplier circuit M and of the memory MM for this purpose. For correct (weighted) addition of the video images, video synchronization pulses SYNC are applied to an address counter AT (FIG. 1a) which, consequently, always assigns the same pixel of the video image to the same address in the memory MM (for both processing circuits RF1 and RF2). It is to be noted that for the sake of simplicity only a simple address counter AT is described for illustrating the operation of the processing circuit RF. However, it will be evident that some time will be required for the fetching of image information from an address in the memory MM and also for the processing of this information and the addition thereto of image information of a next X-ray image by the circuits V, M and A. Therefore, so-called pipeline processing techniques must be used in the processing circuit RF.

For the determination of a differential image, for example, first a short series of X-ray images (for example, four images) is applied to the processing circuit RF1 via S1, said processing circuit forming a composite image (mask without contrast medium) from said short series. Subsequently, S1 is opened and S2 is closed. From each subsequent series of X-ray images (after injection of contrast medium into, for example, the cardiovascular system), a composite image is determined by the processing circuit RF2. The differential image is formed from the sequentially successive, changing composite images from RF2 and the mask from RF1, so that in principle only the cardiovascular system containing contrast medium becomes visible on the monitor.

It is to be noted that the X-ray images which sequentially succeed one another in short series may also be simply summed (for example, for noise suppression, see "Optical Engineering", 17, No. 6, November/December 1978, pages 652–657). In order to perform this operation, the processing circuit RF (FIG. 1b) comprises a switch S so that the X-ray images are summed when the weighting factor K has the value 1 and the switch S is opened.

The FIGS. 2a to e and 3a to e show different waveforms as a function of time which occur during the determination of a differential image. For the waveforms of FIGS. 2a to e it is assumed that each parameter of the X-ray image generating device is constant. For the waveforms of FIGS. 3a to e it is assumed that the X-ray pulse has changed (decreased) after formation of the mask (FIG. 3a) in the memory MM of the processing device RF1. FIGS. 2a and 3a show the amplitudes of a video image. After injection of a contrast medium, a second video image is formed (FIGS. 2b and 3b) in which negative peaks P (only one peak is shown in the drawing) are situated at the areas in which contrast medium is present in the cardiovascular system. FIGS. 2c and 3c show the difference signal between the video images shown in the FIGS. 2a and b and the FIGS. 3a and b, respectively. FIG. 2c clearly shows that only the negative peak P remains as the difference signal if no parameter changes. In FIG. 3c, however, the negative peak P is superposed on an additional negative value; this is due to the fact that the X-ray pulse (or an other parameter, for example, intensification in the image intensifier pick-up tube chain) is not constant (smaller) during the formation of the video images of the FIGS. 3a and 3b. The difference signal is amplified (FIGS. 2d and 3d) and displayed on the monitor MON; for this purpose, a D.C. signal value is added to the amplified difference signal in order to bring the amplified difference signal to be displayed within the operating range W of the monitor MON. FIG. 2e clearly shows that the amplified difference signal, being superposed on the D.C. signal range W of the monitor MON. FIG. 3e directly shows that the amplified difference signal with the added D.C. signal value is situated completely outside the operating range W, so that the screen of the monitor remains completely dark. (If the X-ray pulse had been larger during the formation of the image of FIG. 3b, than during the formation of the image of FIG. 3a, the monitor would have displayed a completely white image).

FIG. 4a diagrammatically shows the variation of an X-ray pulse R as a function of time. The X-ray pulse R is divided into six periods in which each time one X-ray image is formed; FIG. 4b shows the signal variation thereof. The intensity $I_1$ of the X-ray pulse R increases to the desired value (unavoidable switch-on phenomenon); subsequently, it remains constant until the period 4 in which the X-ray pulse R exhibits a dip having a duration of one period, after which it remains constant for two further periods until the instant of switching off, after which it decreases exponentially. FIG. 4b shows a video signal produced by which an X-ray pulse R. The consequences of the switch-on phenomenon and the dip for the variation of the intensity $I_2$ of the video signal are clearly shown. When such a video signal is applied to an automatic gain control circuit (AGC), the signal variation will be as shown in FIG. 4c. The intensity $I_2$ of the video signal of the video image of period 1 is too small, so that the AGC circuit will amplify the video signal more during the second period; this causes an "excessively high" amplitude $I_3$ of the signal on the output of the AGC circuit, because the video signal is much larger during the second period than during the first period. Evidently, the AGC circuit cannot bring the video signals to a desirable, constant amplitude during the periods 2, 3, 4 and 5, because the signals supplied to the AGC circuit during the periods 1, 2, 3 and 4 do not exhibit a "slow" disturbance which is necessary for proper operation of the AGC circuit, but rather a disturbance which fluctuates too rapidly. It will be understood that an AGC circuit cannot function correctly in the described situation, because the AGC circuit "knows" how high the maximum amplitude of the video signal was only after expiration of each period. In view of this fact, the amplification of the video signal is controlled during the next period. Evidently, such a circuit always "tries to catch up", so that it can never fully eliminate the undesirable fluctuations.

Even if there were no dip during the period 4 of the X-ray pulse R, an AGC circuit could not adequately eliminate the switch-on phenomenon; this means that, for example, the video images of the periods 1 and 2 cannot be effectively used for the differential image determination and that the video images of the periods 3 to 6 can be used for this purpose. This is a serious drawback, because one third of the X-radiation is not used, so that a patient is exposed to an unnecessary X-ray load. It will be clear that when, in order to determine a differential image, a composite image is formed from a short series of X-ray images whose amplitudes fluctuate as shown in FIG. 4c, a D.C. shift occurs in the differential image due to the fact that the amplitudes are not constant (with respect to those of the X-ray images used to form the reference composite image (mask)). Consequently, the mean grey value of the differential image fluctuates from one differential image to another, so that the amplitude of the differential image is liable to be situated outside the operating range of the monitor.

Figure 5:
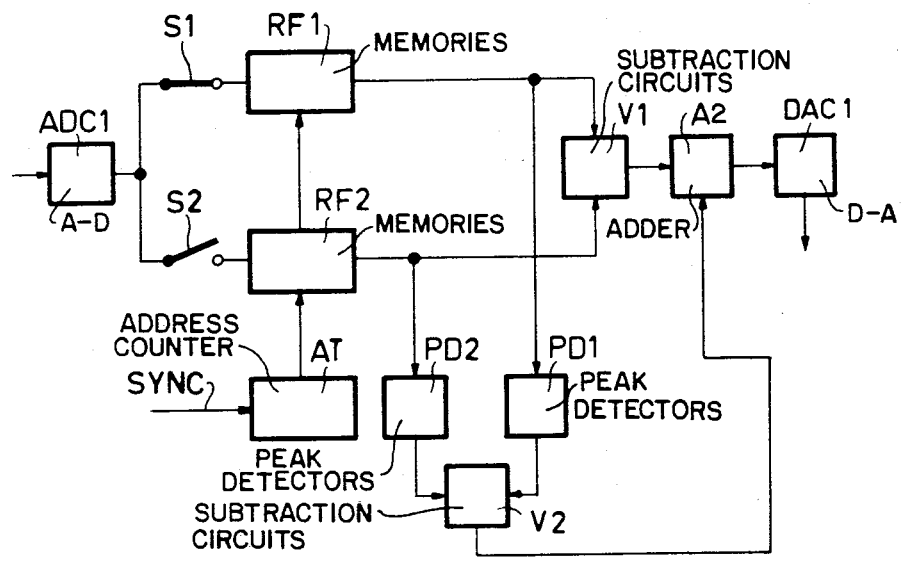
FIG. 5 shows an embodiment of a device in accordance with the invention.

FIG. 5 shows an embodiment of a device 50 in accordance with the invention. The device 50 of FIG. 5 corresponds to the device 10 of FIG. 1a to a high degree and the same reference numerals are used for corresponding elements of the devices. The following elements have been added to the device 10 of FIG. 1a: two peak value detectors PD1 and PD2, a second subtraction circuit V2 and an adder circuit A2. Each of the peak value detectors PD1 and PD2 is connected to an output of the processing circuits RF1 and RF2. The output signals of the two peak value detectors PD1 and PD2 are applied to the subtraction circuit V2 which determines the difference between the peak values of the logarithms of the images stored in the memories MM of the processing devices RF1 and RF2 and which applies this difference to the adder circuit A2 in which the peak value difference is added to the differential image. The differential image thus corrected is applied to the monitor MON (FIG. 1a) via the converter DAC1. The operation of the device in accordance with the invention is as described above. After determination of a first (weighted) image which is stored in the device RF1, the peak value stored by the peak value detector PD1 equals log $V_{max}$, $V_{max}$, the peak voltage of one X-ray image or a weighted peak voltage of a short series of successive X-ray images used to form a composite image. After determination of second (weighted) image, the peak value stored by the peak value detector PD2 is log $V_{max}$+log $\alpha$ as has already been described. The difference between the logarithms of the peak values (log $\alpha$) is determined by means of the subtraction circuit V2 in order to be added to the differential image by the adder circuit. It is to be noted that a differential image to be displayed is fully corrected for variations of the recording parameters only after determination of the peak values of the first (composite) image (in RF1) as well as of the second (composite) image (in RF2). This situation occurs only after the second (composite) image has been (completely) stored in RF1.

Figure 6:
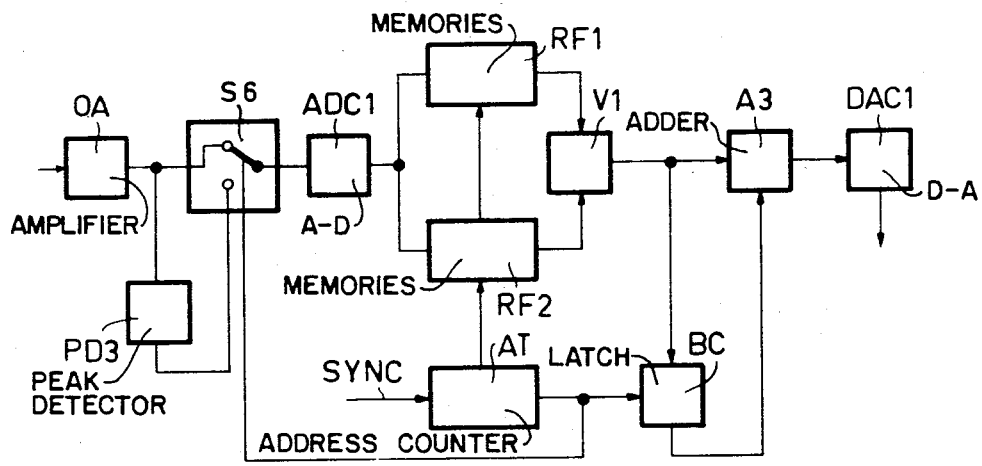
FIG. 6 shows a preferred embodiment of a device in accordance with the invention.

FIG. 6 shows a preferred embodiment of a device in accordance with the invention. The elements of FIG. 6 which correspond to elements shown in FIG. 1a are denoted by the same references. The following elements have been added to the device shown in FIG. 1a: an analog peak value detector PD3 whose input is connected to the output of the amplifier circuit OA and whose output can be connected, via a switch S6 (for example, a FET switch), to an input of the analog-to-digital converter ADC1. Via said switch S6, the output of the amplifier OA is connected to the converter ADC1. The switch S6 is controlled as will be described hereinafter. One output of the address counter AT (FIG. 1a) of both processing devices RF1 and RF2 is connected to the switch S6, so that the switch S6 is connected to the output of peak value detector PD3 only during a given counter position. The counter position preferably corresponds to the last line (or a part thereof) of the video image which contains no diagnostic information in practically all cases. Thanks to the counter AT, the peak value (stored in the peak value detector PD3) of an X-ray image which has just been generated and substantially processed is applied to the converter ADC1, and is digitized in order to be stored in the memory of the device RF (FIG. 1b) at the address present in the counter AT at the relevant instant. The peak value of an X-ray image, therefore, is always stored at a fixed address in the memory. The output of the counter AT also controls a latch-circuit BC which stores the value present on the output of the subtraction circuit $V_1$ upon reception of a control pulse from the counter AT. This value represents the difference between the logarithms of the peak values, stored at a fixed address in the memories of the devices RF1 and RF2. The peak value difference stored in the latch circuit BC is added to the differential image via the adder circuit A3, so that a corrected differential image is displayed on the monitor MON via the converter DAC1.

It is to be noted that again a completely corrected differential image is produced by the device shown in FIG. 6 only after completion of the second (composite) image in RF2, because the peak value of the second image has not yet been applied to the processing device RF2.

Furthermore, it has been found that the correction facility for the differential images should preferably be deactivatable. This is because it may be useful to omit such a correction for given types of examination.

What is claimed is:

1. A method for processing X-ray images comprising the steps of:
    storing at least two X-ray images;
    forming a display image by subtracting, on a pixel-by-pixel basis, the logarithm of a first of said stored images from the logarithm of a second of said stored images;
    calculating the difference between the logarithm of the peak value of said first stored image and the logarithm of the peak value of said second stored image;
    adding the difference of said peak value logarithms to all pixels of said display image; and
    displaying the resultant sum.

2. A method as claimed in claim 1 wherein at least one of said stored images is formed by calculating a weighted sum of a series of successively produced X-ray images.

3. A device for processing X-ray images comprising:
    X-ray image forming means for producing at least two X-ray images;
    at least two memories, each of which is used for storage of one of said X-ray images;
    arithmetic means for calculating, on a pixel-by-pixel basis, the difference between the logarithms of two images stored in the memories; and
    display means for displaying the calculated difference, wherein, as an improvement, the device further comprises:
    detection means for detecting the difference between the logarithms of peak values of the two stored images;
    further storage means for storing the peak value difference; and
    correction means for adding the peak value difference to the displayed calculated difference.

4. A device as claimed in claim 3 comprising:
    a peak value detection circuit having an input connected to the output of the X-ray image production means;
    switching means which supply a peak value of a detected X-ray image to the memory in order to store the peak value in a pixel of the image which is stored in the memory; and
    wherein the arithmetic means comprises a subtraction circuit which receives the logarithms of the amplitude of the images stored in the memories, an adder circuit having an input connected to the output of the subtraction circuit, and a buffer circuit connected to store the difference between the logarithms of the peak values of the images stored in the memories, a second input of the adder circuit being connected to an output of the buffer circuit whereby the adder circuit adds the logarithmic peak value difference to the differential image.

5. A device as claimed in claim 4 wherein the peak value detection circuit is an analog circuit and further comprising an analog digital converter which is connected to digitize the X-ray images and the output of the peak detection circuit.

6. A device for processing X-ray images comprising:
    X-ray image forming means for producing at least two X-ray images;
    at least two memories, each of which is used for the storage of one of said X-ray images;
    arithmetic means for calculating, on a pixel-by-pixel basis, the difference between the logarithms of two images stored in the memories; and
    display means for displaying the calculated difference; wherein, as an improvement, the device further comprises:
    detection means for detecting the logarithms of the peak value in each of the stored images;
    further storage means for storing the logarithms of the peak values; and
    correction means for determining the difference between the stored logarithms and for adding the difference of the logarithms to the displayed calculated difference image.

7. A device as claimed in claim 6 where the detection means comprises:
    logarithmic conversion means for determining the logarithms of the images stored in the memory;
    two peak value detectors which receive the logarithmic values of the amplitude of the images stored in the memories from the logarithmic conversion means and determine the peak values thereof;
    a subtraction circuit having inputs connected to the outputs of the peak value detectors;
    an adder circuit having a first input connected to the output of the subtraction circuit and a second input connected to the output of the arithmetic means; and means for displaying the output of the adder circuit as the corrected differential image.

8. A device as claimed in any of claims 3 through 4 wherein the memories store linear values of the amplitude of the X-ray images and further comprising a logarithmic converter connected to the output of each memory.

* * * * *